INVENTOR
FRANK SASSAK
BY Cullen, Sloman & Cantor
ATTORNEY

INVENTOR
FRANK SASSAK
BY Cullen, Sloman & Cantor
ATTORNEY

Jan. 9, 1968 F. SASSAK 3,362,209
AUTOMATED TUBE MULTIPLE BENDING MACHINE AND METHOD
Filed June 7, 1965 6 Sheets-Sheet 4

INVENTOR
FRANK SASSAK
BY Cullen, Sloman & Cantor
ATTORNEY

Jan. 9, 1968  F. SASSAK  3,362,209
AUTOMATED TUBE MULTIPLE BENDING MACHINE AND METHOD
Filed June 7, 1965  6 Sheets-Sheet 5

INVENTOR
FRANK SASSAK
ATTORNEY

INVENTOR
FRANK SASSAK
BY Calley Sloman & Cantor
ATTORNEY

United States Patent Office 3,362,209
Patented Jan. 9, 1968

3,362,209
AUTOMATED TUBE MULTIPLE BENDING
MACHINE AND METHOD
Frank Sassak, 1033 Vermont Ave.,
Dearborn, Mich. 48226
Filed June 7, 1965, Ser. No. 461,793
11 Claims. (Cl. 72—306)

The present invention relates to an automated tube working machine incorporated into a forming press having a bed, a reciprocal platen mounting a plurality of tube-bending and working means, and with corresponding die or support blocks on said bed for registry with said tube-bending or working means.

It is an object of the present invention to provide a novel carrier by which a tube blank is transmitted through the tube-forming machine in a series of automated steps for achieving a series of forming or working operations in a continuous process.

It is a further object to provide a novel tube carrier adapted for reciprocal vertical movements and intermittent longitudinal reciprocal movements for transporting a tube blank from a loading station to a tube forming station, to a tube manipulating station, to an additional forming or working station, and to an unloading station, all in an automated continuous operation.

It is another object to provide a novel method of forming tubes wherein tube blanks are transported through an automated machine providing a plurality of tube bending and working operations in a continuous process.

These and other objects will be seen in the following specification and claims in conjunction with the appended drawings, in which:

FIGS. 1 and 2 fragmentarily illustrate a side elevational view of the present tube-bending machine with FIG. 2 being a continuation of FIG. 1.

FIG. 7 is a fragmentary perspective view of the tube stock.

FIG. 8 is a similar view of the tube with initial bends formed therein.

FIG. 9 is a perspective view of the tube with the final bends formed therein.

Figure 1:
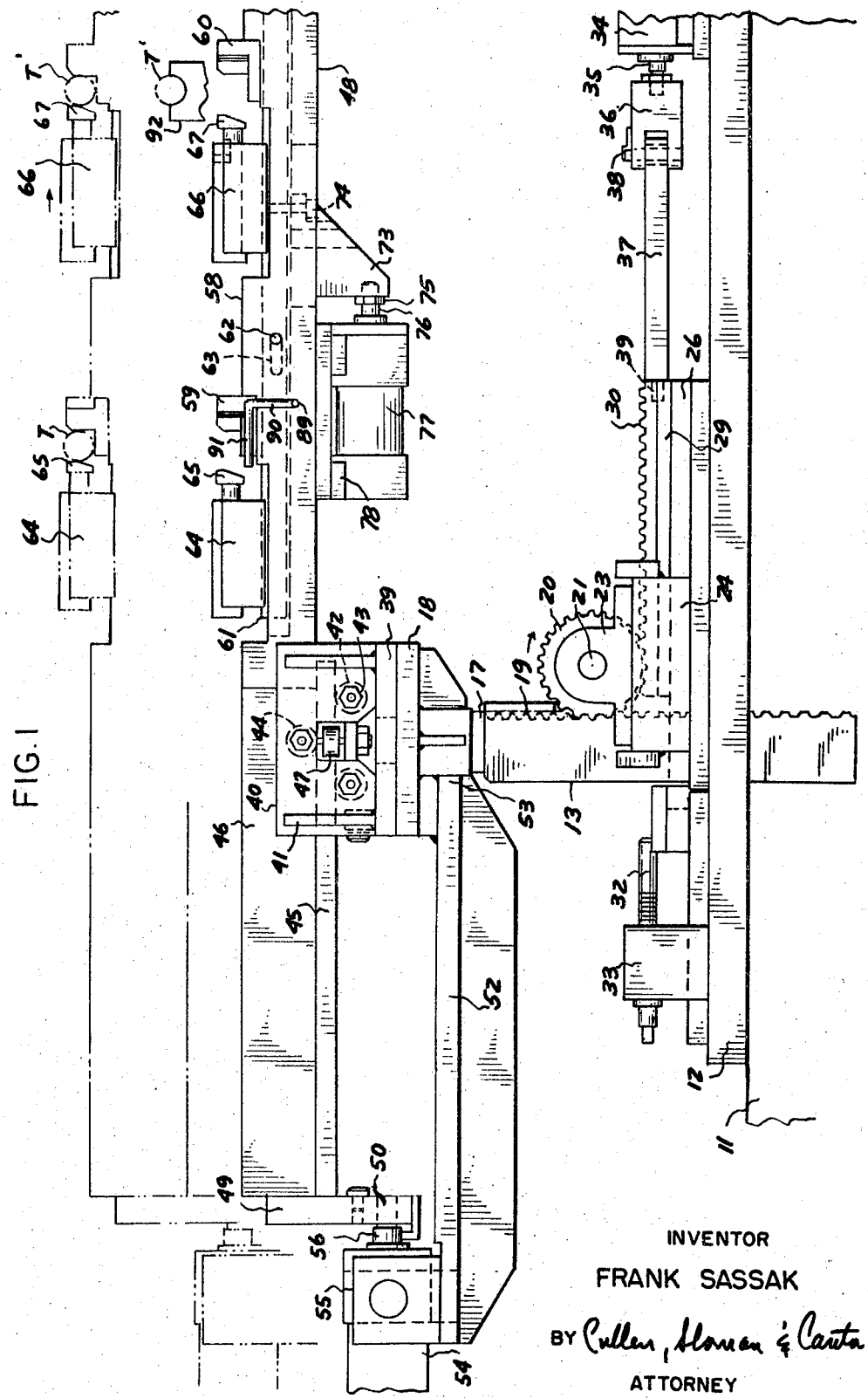

It will be understood the above drawings illustrate merely a preferred embodiment of the invention and method and that other embodiments are contemplated within the scope of the claims hereafter set forth.

Referring to the drawings, the present tube-bending machine is incorporated into a press whose bed is fragmentarily shown at 11, but wherein the reciprocal conventional platen of the press includes a plurality of tube-bending dies, and/or working dies not shown, because the present invention is particularly directed to the carrier mechanism by which the tube is automated through the machine. This application is not concerned with the details of the bending device such as shown in patent application 350,355, filed Mar. 9, 1964, now Patent No. 3,306,093, entitled, Tube Bending Machine; with the exception of die blocks 92 and 99, FIGS. 3 and 4, and support blocks 97, FIG. 4, upon the bed 11.

The device for automating the tube bending operations includes an elongated support 12 secured upon bed 11. Mounted adjacent opposite ends of the support are a pair of upright guides 13 anchored by base flanges 14. Said guides include channels 15-16 within which a pair of longitudinally spaced uprights 17 are slidably mounted for vertical adjustment in unison.

Horizontally disposed top plates 18 are fixedly secured upon the upper ends of said uprights. Each upright has along one side an elongated bifurcated rack gear 19 in mesh with a pinion 20 keyed to shaft 21. Each shaft at its ends is nested in bearings 22 on blocks 23 upon flanged bases 24, FIG. 6. The rack gear elements 19 extend through aperture 25 in support 12.

Extending into each of the guides 13 are the elongated support plates 26 slidably supporting the horizontally aligned rack bars 29, mounting elongated rack gears 30, in mesh with pinions 20. Gear 30 moves through the spaced rack gear elements 19. Opposed side bars 27, FIG. 6, retainingly engage the opposed side edges of rack bar 29, and mount hold-down bars 28 for guiding reciprocal movements of rack bar 29.

Movement in one direction of rack bar 29 is limited by the adjustable stop pin 32 adjustably mounted at 33 upon support 12.

A power means is employed for effecting vertical reciprocal movements in unison of the two uprights 17. This power means includes a hydraulic or pneumatic cylinder 34 anchored on support 12 and including a reciprocal piston and rod 35 which extends from opposite ends thereof. The clevices 36 on opposite ends of rod 35 are pivotally connected at 38 to links 37, which are secured as at 39 to rack bars 29. Reciprocal movements of piston rod 35 relative to motor 34 will effect reciprocal movement of the corresponding rack gears 30 in mesh with pinions 20. The latter are in mesh, respectively, with rack gears 19 upon uprights 17 for effecting vertical movements thereof in unison.

Figure 2:
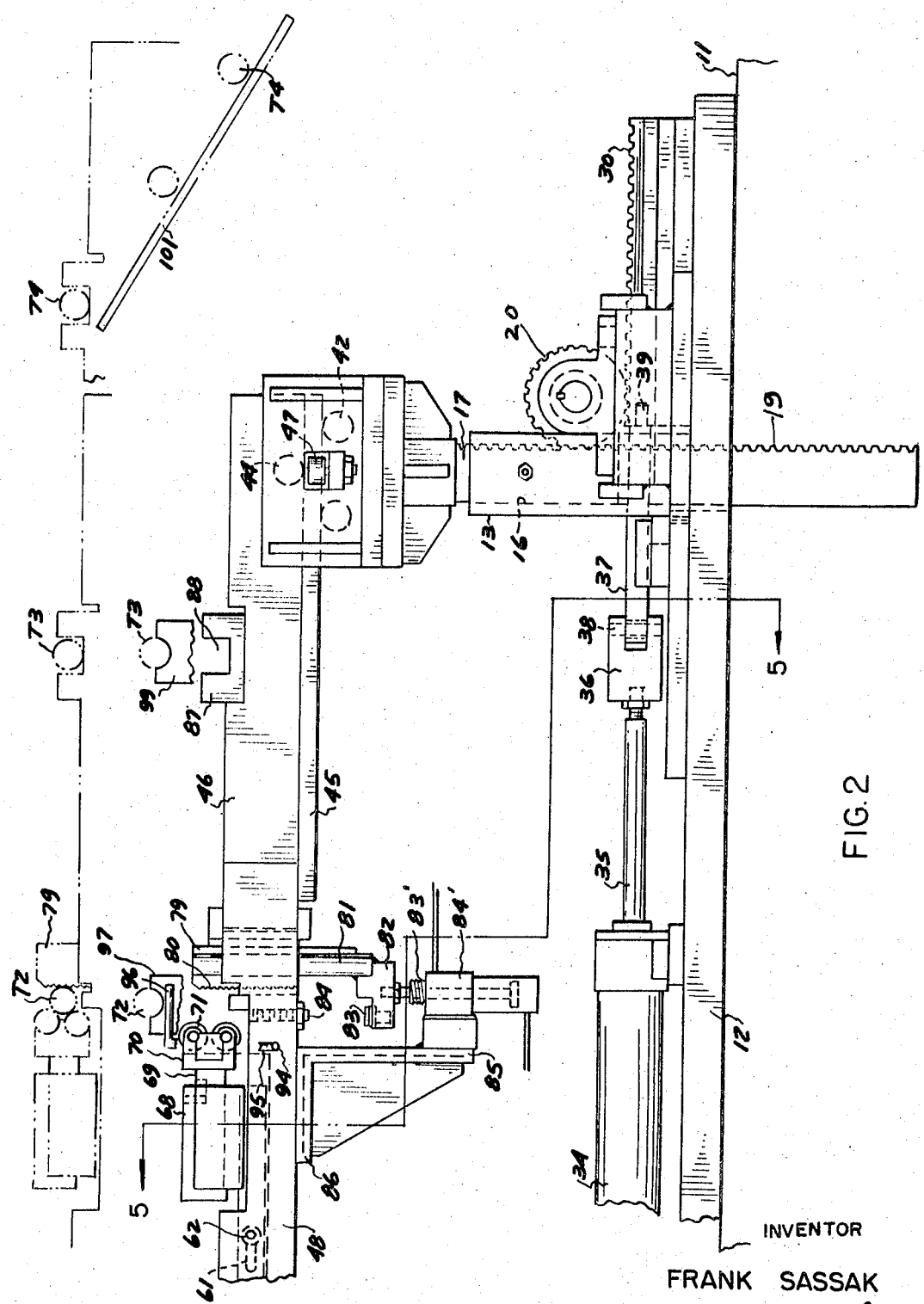
Figure 6:
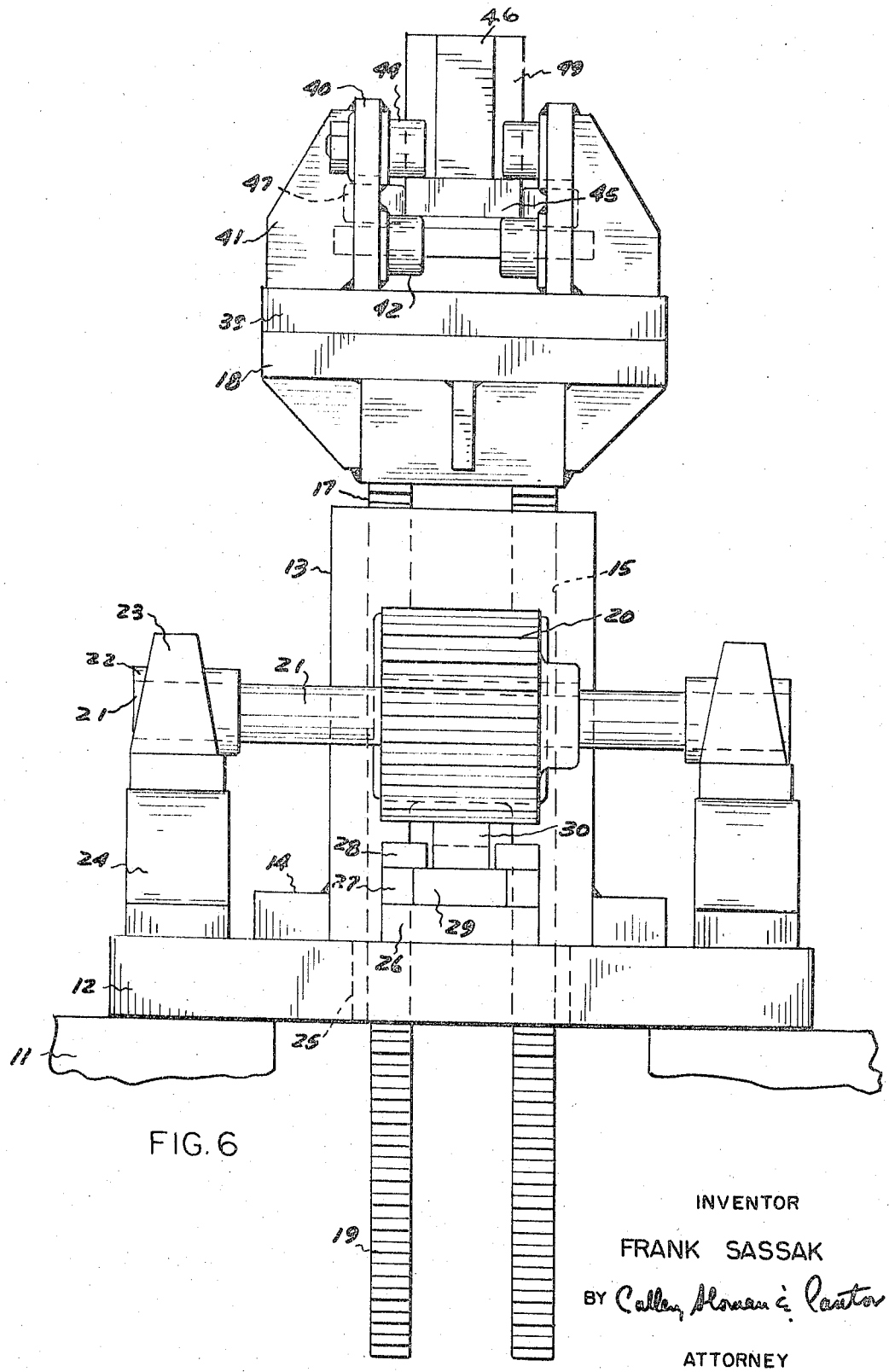
FIG. 6 is an end elevational view of FIG. 2, on an increased scale.

Platforms 39 are fixedly mounted on each of the top plates 18, FIGS. 1 and 2, with each platform, including a pair of upright guideplates 40, reinforced at 41, FIG. 6. Said plates are adapted to slidably support the horizontally disposed ends 45 of tube carrier 48, which is reciprocally movable thereon.

The opposed pairs of guide rolls 42 anchored at 43 upon guide plates 40 slidably support the inverted T-shaped ends 45-46 of carrier 48.

Upright rolls 47 journalled within plates 40 engage opposite sides of the carrier ends 45. Hold-down rolls 44 project from opposite sides of plates 40 for guidably anchoring tube carrier ends 45-46 upon the respective platforms 39 for intermittent reciprocal movements in a horizontal direction.

Upright bar 49, FIGS. 1 and 6, depends from and controls reciprocal movements of carrier 48. Table 52 is joined at 53 to top plate assembly 18 on upright 17. Hydraulic or pneumatic cylinder 54, fragmentarily shown, is anchored at one end at 55 upon an outer portion of vertically movable table 52. Cylinder 54 includes reciprocal piston rod 56 joined to carrier 45-48 as at 50 for effecting the reciprocal movements thereof.

The central portion of carrier 48 has an upwardly opening portion 58 carrying a reciprocal slide 61 for mounting adjustable grips 65, 67, and 71. Carrier 48 also mounts thereon a series of stationary grips 59, 60, and vertically adjustable grip 79, FIG. 2. Tube gripping and supporting means are thus mounted on carrier 48. Such gripping means correspond respectively to a tube loading station, a tube bending station, a tube manipulating station, a tube working station, and a tube unloading station.

Grips 59, 60 and 79 have in association therewith a series of movable jaws 65, 67 and 71 for anchoring the tube T during its automated intermittent transfer through the tube bending machine.

There is provided within the slotted portion 58 of carrier 48 an elongated slide 61 carrying the pins 62 movable in slots 63 for limiting reciprocal movements thereof. Block 64, FIG. 1, adjacent one end of slide 61 mounts yieldable jaw 65 for cooperation with stationary jaw 59 when slide 61 has been moved to the right to engage tube T at the loading station.

An intermediate block 66 is anchored upon slide 61 and includes yieldable grip 67 which on movement of said slide is adapted for cooperative registry with stationary grip with a tube T' interposed as shown in dotted lines, FIG. 1. This corresponds to the "high" position of carrier 48 adjacent first bending station.

An additional block 68 is mounted adjacent one end of slide 61 and carries yieldably mounted shank 69 with head 70 mounting a pair of gripping rollers 71. The latter are adapted for cooperative registry with grip 79, shown in dotted lines, FIG. 2, for retaining tube T2 therebetween at a tube manipulating station.

Each of the movable grips 65, 67 and 71 move in unison, all being mounted upon the power operated reciprocal slide 61 on carrier 48. Slide 61 is fixedly secured at 74 to bracket 73 which underlies carrier 48 and is secured at 75 to the reciprocal piston rod 76 of the hydraulic or pneumatic cylinder 77 anchored at 78 to carrier 48.

The vertically movable grip 79, serrated at 80, corresponds to a manipulating station for rotating tube T2 about its axis for the final bending thereof as at bending station corresponding to T3, FIG. 2, or for additional working.

Vertically adjustable grip 79 has a depending shank 81 terminating in lift plate 82 mounting adjustable stop 83 movable with respect to stop 84 on the undersurface of the carrier. Threaded element 83' is adjustably mounted upon housing 84' anchored by bracket 85-86 to the undersurface of carrier 48. Element 84', a hydraulic or air cylinder, provides a power means for effecting intermittent vertical adjustments of serrated grip 79 when the tube T2 has been brought into cooperative registry therewith by movable jaws 71. So engaged, upward or downward movement of movable jaw 79 will cause a rotary orientation of tube T2 about its axis for repositioning the tube for a further bending or working step at station T3.

Upon the carrier towards one end is an additional support 87 slotted at 88 to cooperatively and supportably receive the tube T3. Upon upward movement of carrier 48 support 87 disengages tube T3 from die blocks 99 which project from bed 11, FIG. 4. After manipulation of tube T2 the carrier elevates and moves tube T2 to position T3 and lowers. This transfers tube T3 onto die blocks 99 for a final bending or working as shown in FIG. 9.

Tube support 87 is employed for transferring tube T3 from the final working station upwardly, as shown in dotted lines, and then horizontally to unloading station T4, shown in dotted lines, FIG. 2. This delivers the finished tube T4 to the inclined uploading ramp 101. Tube T4 gravitates along ramp 101 after the carrier 45 has been downwardly displaced.

Figure 3:
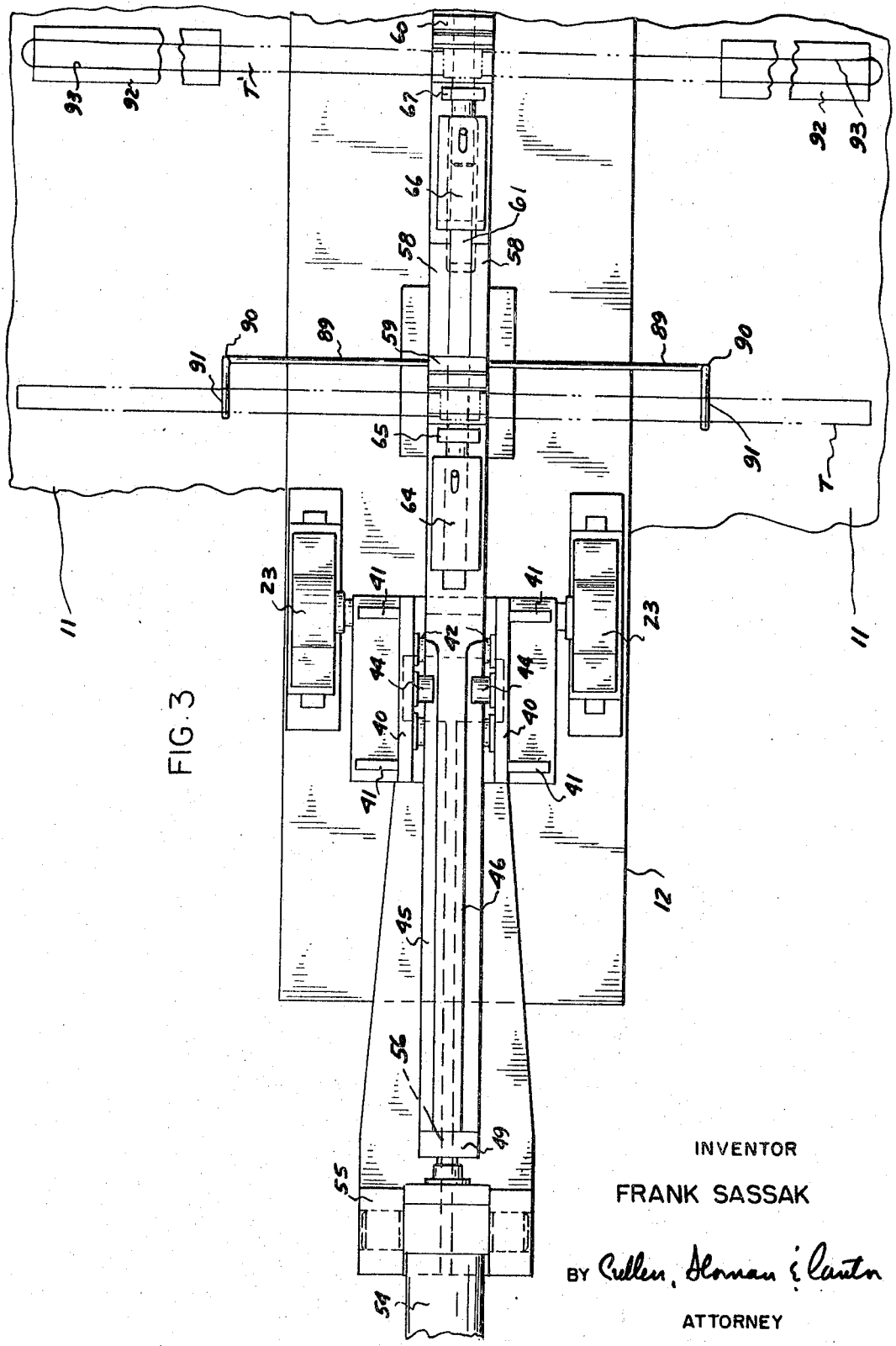
FIGS. 3 and 4 are fragmentary plan views of FIGS. 1 and 2, respectively.
Figure 4:
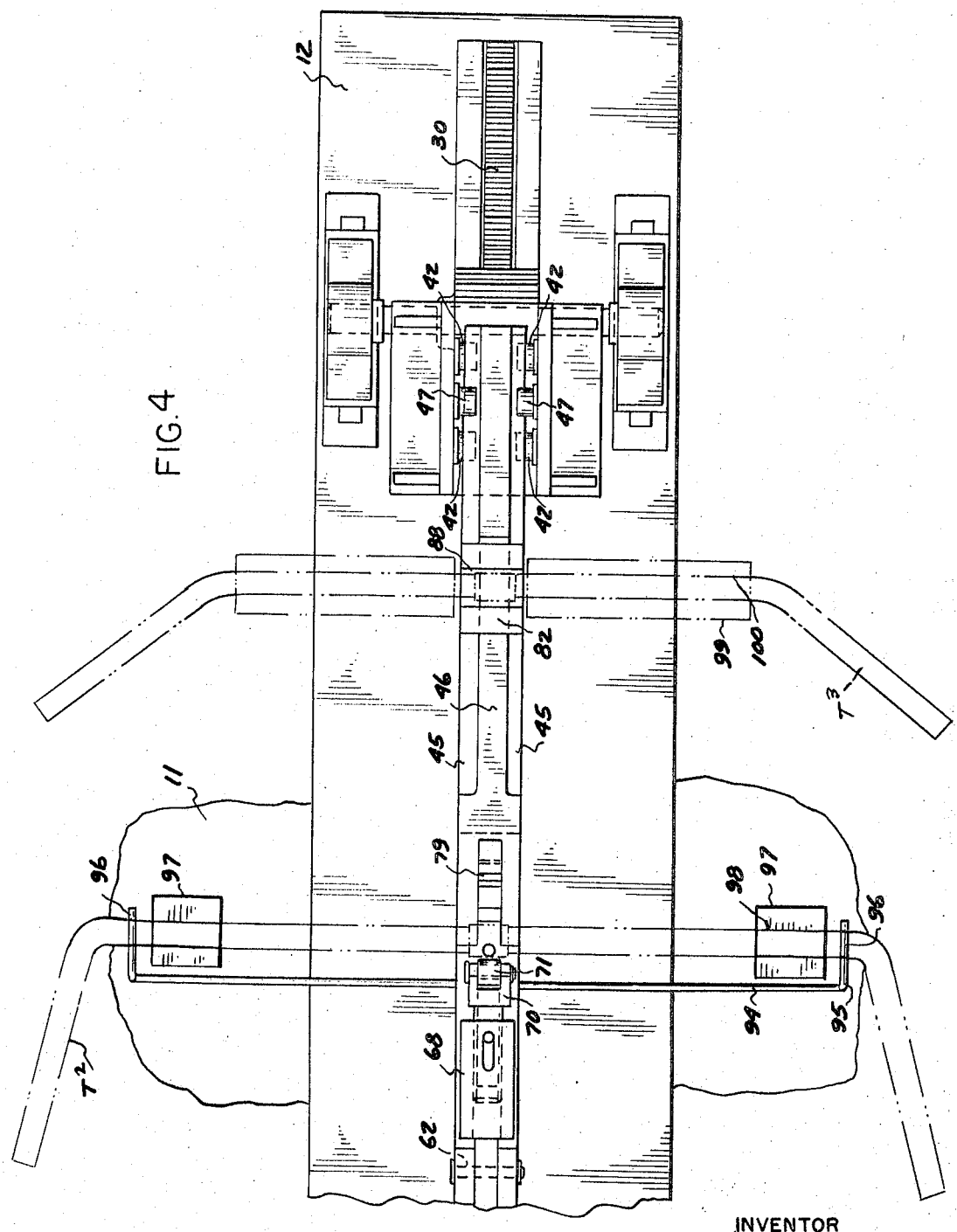
Figure 5:
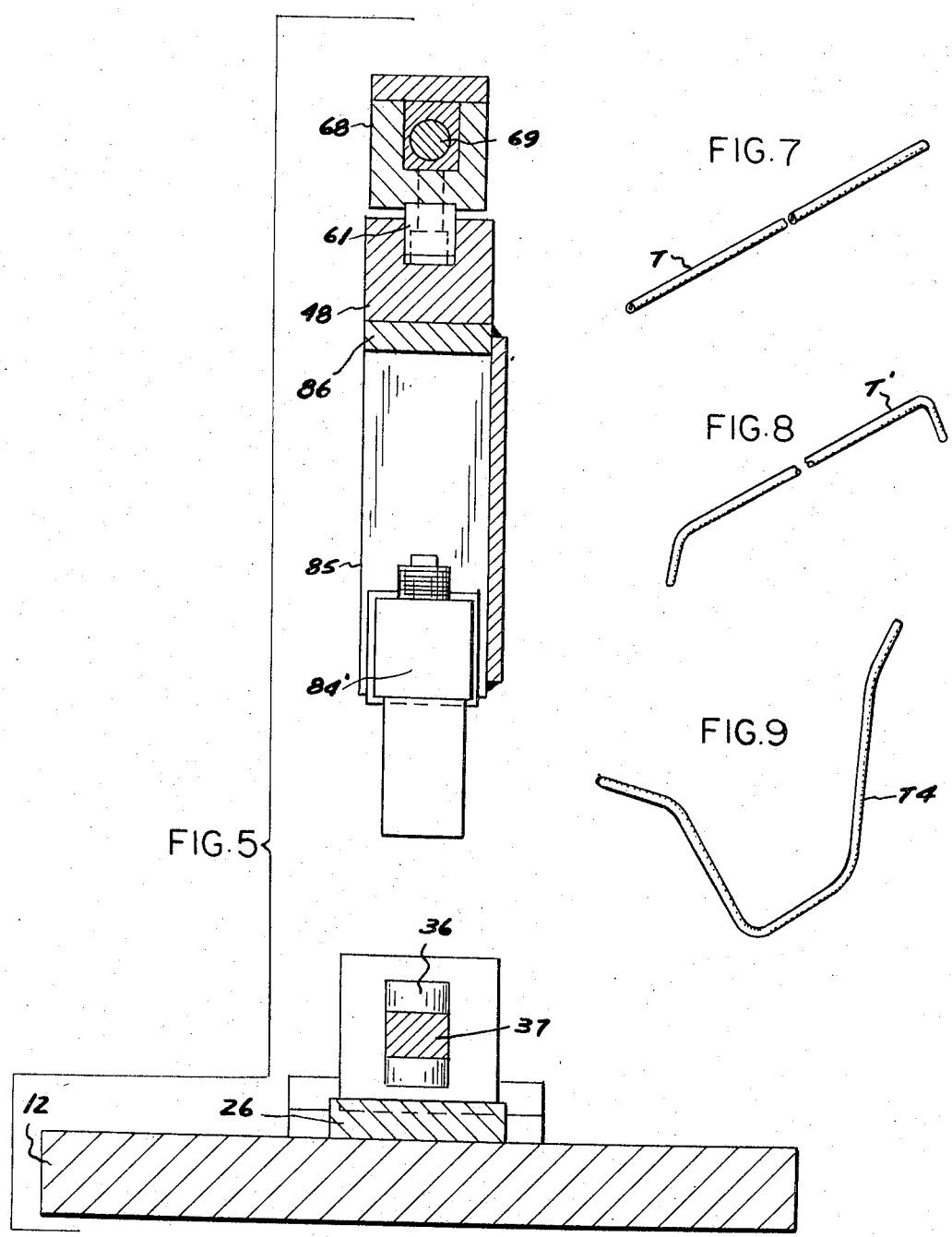
FIG. 5 is a fragmentary section on an enlarged scale taken in the direction of arrows 5—5 of FIG. 2.

At the loading station T and in conjunction with grips 59-65 there projects from opposite sides of carrier 48 the elongated support rod 89, FIGS. 1 and 3, whose ends are upturned at 90 and further turned at right angles at 91 to supportably engage outer portions of straight stock tube T as it is loaded into the machine, and delivered by a suitable hopper not shown.

The first tube bending station corresponding to T1 of FIG. 1, provides a pair of upright die blocks 92 which have transverse aligned grooves 93 for supporting tube and for cooperation with an opposed pair of bending means connected to the vertically movable part of the press, not shown, in effecting the initial bending of outer portions of the tube, FIG. 8.

After this initial bending operation, tube T1 between grips 60-67 is elevated and transferred by carrier 48 to the manipulating station, designated T2. Carrier 48 lowers transferring tube T2 to supports 97 grooved at 98; after which the carrier retracts horizontally and as the carrier next elevates grips 71 and 79 engage tube T2 lifting it from supports 97. Vertical upward movement of grip 79 relative to grips 71 causes tube T2 to be oriented or manipulated. When tube T2 rested upon the supports 97 it was further supported by transverse bar 94. The latter projects from opposite sides of carrier 48 and at its ends has upturned portions 95 and horizontal portions 96 for supporting outer end portions of tube T2.

Through longitudinal movement of the carrier, the oriented tube T2 is then translated in a timed sequence to bending station T3 in vertical registry with the opposed pair of upright die blocks 99. These project from bed 11 and are grooved at 100 to cooperatively receive and support tube T3 for the final bending operation, when the carrier has moved downwardly, FIG. 2.

In FIGS. 1 and 2 carrier 48 is shown in its "low" position and in dotted lines at its "high" transfer position. When carrier is in "high" position the tube in its stages of formation or manipulation is positioned above the tube support dies 92, 97 and 99. At the bending stations carrier 48 is below the top surfaces of the tube support dies 92 and 99 and disengaged from tube T1 and T3 then supported for a forming upon the respective die blocks.

*Method*

The method of operation of the present automated tube multiple bending machine includes the following steps:

(1) From a suitable hopper attached to the press, not shown, unformed tube T is loaded upon carrier 48 between grips 59, 65.

(2) Securing tube T between grips 59 and 65 and elevating the carrier to high position (dotted lines).

(3) Horizontally translating the carrier, positioning the tube, as indicated at T' in registry with a first bending station within the press above the pair of bending die blocks 92.

(4) Lowering the carrier to the solid line position, FIG. 1, transferring the tube T1 to die blocks 92. At the same time grips 59, 65 have released the tube; and the carrier in low position retracts horizontally.

(5) Simultaneously bending outer end portions of the tube T' on downward movement of the press and bending dies.

(6) Elevating the carrier to high position, lifting the formed tube T1 as engaged by the grips 60, 67 from die blocks 92 to the dotted line position shown in FIG. 1.

(7) Longitudinally translating the carrier, positioning the tube at T2 in registry with the manipulating station still between grips 60, 67 above the opposed support blocks 97.

(8) Lowering the carrier, transfering the tube T2 to support blocks 97. In the low position, the carrier retracts horizontally to the position shown in FIG. 1.

(9) Carrier now elevates and tube T2 is now engaged between grips 71, 79 and this tube is now disengaged from blocks 97.

(10) Rotating the tube T2 through an arc about its axis on upward movement of grip 79 relative to grips 71.

(11) Longitudinally translating the carrier to the right positioning tube T3 in registry with the second bending station above the second pair of transversely arranged upright inwardly positioned die blocks 99.

(12) Lowering the carrier transferring the tube T3 to die blocks 99; and thereafter the carrier in low position retracts to the left to the position shown in FIG. 2.

(13) Simultaneously bending inner portions of the tube to the shape shown in FIG. 9, by downward movement of the press platen carrying bending dies, not shown.

(14) Elevating the carrier, lifting the formed tube T3 from die blocks 99 using tube support 87 on the carrier.

(15) Longitudinally translating the carrier to the right positioning the formed tube T4 above inclined unloading ramp 101.

(16) Lowering the carrier, transferring the formed tube T4 onto the unloading ramp and then retracting the carrier to the left back to its initial position, FIG. 2.

It is contemplated that those steps pertaining to manipulation of the tube could be omitted, if desired, if the second bending operation is to occur without rotation of the tube about its axis.

Operation

In operation, the carrier and each of the sets of grips move successively clockwise around an imaginary rectangle in a vertical plane. First upwardly, then to the right, then down, and then to the left. Thus, each grip successively engages the tube and secures it during longitudinal translation from one station to the next adjacent station, holds and releases the tube while the carrier drops permitting disengagement of the tube from the carrier onto one of the die or support elements 92, 97 or 99; and then the grips retract horizontally to the initial position.

After loading one tube at position T, the carrier is then supporting four tubes, i.e. at positions T, T1, T2 and T3. By a simultaneous action, after the carrier moves vertically to the "high" position, it translates longitudinally to the right of FIGS. 1 and 2. All the tubes move over one station. T moves to first bending station; T1 moves to manipulating station; T2 moves to second bending station; and T3 moves to unloading station.

When the carrier drops to "low" position, all four tubes are disengaged from the carrier. T1 rests on die blocks 92, T2 rests on support blocks 97, T3 rests on die blocks 99, and T4 drops onto unloading ramp 101, all of this in unison. After the lowering of the carrier, it retracts horizontally to the left of its initial position, FIG. 1, and a new tube T is then loaded onto the carrier relative to grips 59, 65, and the cycle is repeated in a continuous automated operation.

Each time the tubes are transferred onto the die blocks 92 and 99 and onto the support blocks 97, the platen of the press moves downwardly carrying the bending dies down to form the tubes at the die blocks 92 and 99 after which the bending mechanism retracts with the press platen. The cycle continues with the subsequent upward movement of the carrier 48 to the dotted line position shown in FIG. 1. This is the position of the carrier before it has translated to the right.

The present multiple tube bending or forming machine could be limited to two stations, or to any number, practicing the method herein.

In the illustrations reference is made to bending on both ends of a tube simultaneously. Use of the term bending is intended to include as equivalent operations any working steps, such as flattening, piercing, extruding, sizing, flanging, and the like. Alternately, in the use of the present machine, at one station it is possible that only one end of the tube be bent or formed or worked.

The tube manipulating device 71–79 of FIG. 2 is shown at the third manipulating station. Such tube manipulation could take place in accordance with the present invention at any or at all stations as desired.

Having described my invention, reference should now be had to the following claims.

I claim:

1. In an automated tube multiple-bending machine adapted for use with a press having a bed and a plurality of vertically movable tube bending or working means;
a support upon the bed;
a pair of longitudinally spaced guides on the support;
an upright in each guide mounted for vertical adjustments thereon in unison;
an elongated horizontally disposed tube carrier slidably mounted upon said uprights longitudinally of the support;
power means joined to said carrier for reciprocally and intermittently moving the carrier horizontally;
power means on said support for reciprocally and intermittently moving said uprights vertically;
a series of tube gripping and receiving means on said carrier adapted to transversely and centrally receive a tube, and longitudinally spaced to correspond to the spacing of tube loading, tube bending or working, and tube unloading stations;
and longitudinally spaced pairs of opposed upright tube supporting die blocks mounted upon said bed in vertical registry with said tube working means;
said carrier having a "high" position above the tube support dies, and a low position below said tube support dies and disengaged from the tubes, each gripping and supporting means adapted to move with the carrier from one station to an adjacent station and back for successively and continuously transporting tubes in a continuous manner to each of said stations respectively.

2. In the automated tube-bending machine of claim 1, the power means for moving said uprights including first rack gears on said uprights;
longitudinally spaced pinions journalled on said support in mesh with said rack gears respectively;
longitudinally spaced second rack gears reciprocally and slidably mounted on said support in mesh with said pinions respectively;
and a motor on said support having an intermittently reciprocal element joined to said second rack gears.

3. In the automated tube-bending machine of claim 1, the mounting of said carrier including a platform upon the upper end of each upright;
guideplates upon each platform receiving said carrier;
and opposed pairs of support, hold-down, and guide rolls engaging opposite sides of said carrier towards its opposite ends.

4. In the automated tube-bending machine of claim 1, the power means for said carrier including a motor mounted upon one of the said uprights and having an intermittently reciprocal element joined to said carrier.

5. In the automated tube-bending machine of claim 1, the gripping means on said carrier including longitudinally spaced stationary jaws;
an elongated reciprocal slide mounted upon said carrier;
a series of longitudinally spaced movable jaws secured on the slide;
and a motor on said carrier including an intermittently reciprocal element joined to said slide causing tube gripping and release movements of said movable jaws relative to the stationary jaws.

6. In the automated tube-bending machine of claim 1, said machine including at least one tube manipulating station including a pair of opposed transversely spaced tube support blocks mounted upon the bed, adapted to support the tube when the carrier is in a "low" position;
said tube gripping and receiving means including a serrated vertically movable tube engaging jaw on said carrier corresponding to said manipulating station; and
a jaw on said carrier movable relative to said serrated jaw;
and power means on said carrier operably engaging said movable jaw for effecting a predetermined rotation of the tube about its axis.

7. In the automated tube-bending machine of claim 1, said unloading station including a downwardly inclined tube delivery ramp, underlying a tube support on said carrier when in its "high" position;
vertical movement of said carrier to its "low" position releasing the finished tube to said ramp for gravitation movement thereon.

8. The method of bending tubes comprising the following steps in succession:

loading a tube to be formed upon a supporting carrier within a press between its bed and a movable platen mounting tube bending or forming means;
gripping the tube on the carrier;
elevating the tube and carrier;
longitudinally translating the carrier from a first position to a second position;
positioning the tube in registry above a pair of die blocks;
lowering the tube and carrier transferring the tube to said die blocks;
simultaneously working outer end portions of the tube, with said carrier retracting horizontally to its first position;
elevating the tube and carrier lifting the formed tube from the die blocks;
longitudinally translating the carrier to second position positioning said tube in registry with a second bending or working station above a second pair of die blocks;
lowering the tube and carrier transferring the tube to said second die blocks;
simultaneously bending or working inner portions of the tube;
said carrier retracting horizontally to first position;
elevating the tube and carrier lifting the formed tube from the second die blocks;
longitudinally translating the carrier to second position positioning the formed tube above an inclined unloading ramp; and
lowering the tube and carrier transferring the finished tube onto said ramp, said carrier retracting horizontally to first position.

9. In the method of bending tubes of claim 8, the intermediate steps following elevating of the tube after first working;
longitudinally translating the carrier positioning said tube in registry with a manipulating station above a pair of support blocks;
lowering the tube and carrier transferring the tube to the support blocks, said carrier retracting horizontally to first position;
elevating the tube lifting it from the support blocks;
rotating the tube through an arc about its axis, the tube being reoriented for a successive bending or working step.

10. The method of automating the transfer of a tube through a bending machine, including a bed with die or support blocks and a vertically reciprocal platen mounting a plurality of separate bending or working dies comprising:
loading a tube blank upon a horizontally disposed carrier adapted to support a series of tubes at loading, bending or working, manipulating, and unloading stations;
moving each tube on said carrier in a series of intermittent timed movements in a vertical plane successively upwardly, translated to the right, and downwardly, with the carrier translated to the left to its initial position, so that the tube is successively moved from station to station and unloaded in a continuous process;
the positioning of the tube blank at each successive station being accompanied by a bending or forming of the tube by such working dies in cooperation with said die blocks and with the tube intermittently gripped and released as it is translated from one station to another in a continuous cycle.

11. In the method of claim 10, the intermediate steps at any station prior to a working or forming step of manipulating or partly rotating the tube about its axis.

References Cited

UNITED STATES PATENTS 2,565,717    8/1951    Bragren _____ 72—306
2,737,834    3/1956    Coughlin et al. _____ 72—14

CHARLES W. LANHAM, *Primary Examiner.*

R. D. GREFE, *Assistant Examiner.*